UNITED STATES PATENT OFFICE.

LOUIS ANTOINE GARCHEY, OF PARIS, FRANCE.

MANUFACTURE OF OBJECTS OF IMITATION STONE.

SPECIFICATION forming part of Letters Patent No. 587,809, dated August 10, 1897.

Application filed June 23, 1896. Serial No. 596,630. (No specimens.) Patented in France January 16, 1896, No. 253,256.

*To all whom it may concern:*

Be it known that I, LOUIS ANTOINE GARCHEY, a citizen of the Republic of France, residing in Paris, France, have invented certain new and useful Improvements in the Manufacture of Objects of Imitation Stone, (the same being the subject-matter of Letters Patent in France, No. 253,256, dated January 16, 1896,) of which the following is a specification.

This invention is based on the fact that glass highly heated for a long time undergoes a change which may be termed "devitrification," becoming opaque and similar to porcelain. It can no longer be cut by a diamond. I take advantage of this phenomenon to manufacture artificial or what may be termed "ceramic" stones and objects of that material, which I effect as follows: I pulverize glass, preferably that charged with lime and soda. I mix the powder in varying proportions with suitable coloring materials and place the mixture in an iron mold-box having a movable bottom capable of sustaining considerable pressure, this mold being first internally faced with sand, lime, or the like to prevent adhesion of the glass. I subject the charged mold to gradually-increasing heat in a suitable furnace until the glass is near fusion, in which condition it begins to become devitrified. Preferably I pass it through a heated gallery, so regulated that on its exit therefrom the glass has been heated nearly to the point of fusion. The mold is then carried to a smelting-furnace and heated to fusion, by which the glass becomes pasty and its particles are welded together and the devitrification is completed. The mold is then taken to a suitable press and the pasty glass is molded under pressure. The article is then annealed, either in the mold or by being first removed from the mold. The molded piece has the appearance of stone and can be formed in any architectural shape desired. If desired, the article may be submitted to the action of glass-tempering, which avoids the annealing.

When imitations of marble are desired, I scatter over the pasty devitrified glass pieces of colored glass which when melted with the devitrified glass and stirred to and fro form veins, as in marble, and then the mass in a pasty state is molded under pressure.

For making rough-faced stone I place at the upper part of the mold coarse pieces of glass of uniform quality which will not melt completely, but which become united to the vitreous mass forming the base. The upper bed becomes devitrified.

I can also produce pieces of devitrified glass for the same or other uses by flowing under the press, either directly or in a mold, liquid glass of easy devitrification. This glass, flowed over the coarse glass and submitted to the same stamping operation, may be devitrified by placing in a reheating-oven at high temperature until the devitrification is complete, after which the annealing or tempering is performed.

I claim—

1. The process of making blocks or other articles of glass, which consists in placing pulverized or broken glass in a mold, heating it until it forms a devitrified paste then molding it under pressure, and then annealing or tempering it.

2. The process of making building-blocks or other articles of imitation stone, marble, &c., which consists in heating glass to the point where it becomes a devitrified paste, scattering pieces of colored glass over the surface thereof, fusing the mass to incorporate these pieces, molding it under pressure to the desired shape and finish, and finally annealing or tempering it.

In witness whereof I have hereunto signed my name in the presence of two subscribing witnesses.

LOUIS ANTOINE GARCHEY.

Witnesses:
CLYDE SHROPSHIRE,
ALEXANDRE MATHIERS.